(12) United States Patent
Brown et al.

(10) Patent No.: US 9,195,725 B2
(45) Date of Patent: Nov. 24, 2015

(54) RESOLVING DATABASE INTEGRATION CONFLICTS USING DATA PROVENANCE

(75) Inventors: Kyle Gene Brown, Apex, NC (US);
Rada Chirkova, Cary, NC (US);
Ioannis Viniotis, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 13/555,559

(22) Filed: Jul. 23, 2012

(65) Prior Publication Data

US 2014/0025645 A1    Jan. 23, 2014

(51) Int. Cl.
*G06F 17/30* (2006.01)

(52) U.S. Cl.
CPC .... *G06F 17/30557* (2013.01); *G06F 17/30575* (2013.01); *G06F 17/30578* (2013.01)

(58) Field of Classification Search
CPC .................................................. G06F 17/30575
USPC ........................... 707/690, 692, 693, 694, 696
See application file for complete search history.

(56) References Cited

U.S. PATENT DOCUMENTS

| | | | |
|---|---|---|---|
| 6,108,670 A | 8/2000 | Weida et al. | |
| 6,473,851 B1 | 10/2002 | Plutowski | |
| 7,685,125 B2 | 3/2010 | Chen | |
| 7,769,714 B2 | 8/2010 | Lu et al. | |
| 7,962,457 B2 | 6/2011 | Deffler | |
| 8,712,973 B2* | 4/2014 | Ramachandran | 707/691 |
| 2005/0060281 A1 | 3/2005 | Bucher et al. | |
| 2006/0259442 A1* | 11/2006 | Iqbal | 705/400 |
| 2006/0288081 A1 | 12/2006 | Sung et al. | |
| 2008/0027965 A1* | 1/2008 | Garrett et al. | 707/102 |
| 2008/0126399 A1 | 5/2008 | MacGregor | |
| 2008/0177755 A1 | 7/2008 | Stern et al. | |
| 2009/0228905 A1* | 9/2009 | Aghajanyan et al. | 719/328 |
| 2009/0254572 A1* | 10/2009 | Redlich et al. | 707/10 |
| 2010/0043051 A1* | 2/2010 | Deputat et al. | 726/1 |
| 2010/0070463 A1 | 3/2010 | Zhao et al. | |
| 2010/0114628 A1 | 5/2010 | Adler et al. | |
| 2010/0114629 A1 | 5/2010 | Adler et al. | |
| 2010/0162276 A1* | 6/2010 | Sim et al. | 719/328 |

(Continued)

FOREIGN PATENT DOCUMENTS

CN           1794207 A       6/2006

OTHER PUBLICATIONS

Tseng et al.; "Data Provenance Maintenance for Heterogeneous Database Queries", Taiwan, National Science Council, 2011.

(Continued)

*Primary Examiner* — Mohammad S Rostami
(74) *Attorney, Agent, or Firm* — Terry Carroll; Edell, Shapiro & Finnan, LLC

(57) ABSTRACT

A method, a system and a computer program product for resolving conflicts between data for database integration. Data is integrated from first and second data sources to produce integrated data, and the presence of a conflict is determined between data from the first data source and data from the second data source, where one or more sets of prioritized policies for resolving conflicts is associated with data of the first and second data sources. A policy is selected from the set of prioritized policies associated with the conflicted data, where the selected policy is appropriate to resolve the conflict and includes the greatest priority. The selected policy is applied to resolve the conflict and to produce a resulting data value for the integrated data.

15 Claims, 4 Drawing Sheets

(56) References Cited

U.S. PATENT DOCUMENTS

| | | | |
|---|---|---|---|
| 2010/0211542 A1* | 8/2010 | Starbuck | 707/610 |
| 2010/0265825 A1* | 10/2010 | Blair et al. | 370/236 |
| 2010/0316355 A1* | 12/2010 | Bumgardner et al. | 386/292 |
| 2011/0004702 A1* | 1/2011 | Tsofi et al. | 709/248 |
| 2011/0029495 A1* | 2/2011 | Selvan Rama Samy | 707/695 |
| 2011/0088009 A1 | 4/2011 | Jones et al. | |
| 2011/0218920 A1* | 9/2011 | Agrawal et al. | 705/50 |
| 2011/0302479 A1* | 12/2011 | Movida et al. | 714/798 |
| 2011/0314075 A1* | 12/2011 | Boldyrev et al. | 709/201 |
| 2011/0321122 A1* | 12/2011 | Mwangi et al. | 726/1 |
| 2012/0179654 A1* | 7/2012 | Lukiyanov et al. | 707/638 |
| 2012/0185434 A1* | 7/2012 | Giampaolo et al. | 707/634 |
| 2012/0221605 A1* | 8/2012 | Sanghvi et al. | 707/803 |
| 2012/0284684 A1* | 11/2012 | Michaely et al. | 717/103 |
| 2013/0262419 A1* | 10/2013 | Kilian et al. | 707/695 |

OTHER PUBLICATIONS

Chapman et al.; "PLUS: A Provenance Manager for Integrated Information", IRI IEEE International Conference on, Aug. 3-5, 2011, pp. 269-275.

Gehani et al.; "Policy-Based Integration of Provenance Metadata", Policy IEEE International Symposium on, Jun. 6-8, 2011, pp. 149-152.

U.S. Appl. No. 13/183,840.

U.S. Appl. No. 13/183,847.

U.S. Appl. No. 13/183,850.

U.S. Appl. No. 13/358,594.

International Search Report and Written Opinion in International Application No. PCT/IB2012/052734, mailed Oct. 18, 2012.

* cited by examiner

RESOLVING DATABASE INTEGRATION CONFLICTS USING DATA PROVENANCE

BACKGROUND

1. Technical Field

Present invention embodiments relate to integrating data from different data sources and, more particularly, to resolving conflicts between data between different sources during the integration.

2. Discussion of Related Art

It is sometimes necessary to integrate two or more heterogeneous databases. The integration of heterogeneous databases is known and spans multiple industries, since it is often necessary to combine data from two or more companies or other business entities for access by a single interface. It is particularly important in certain industries (e.g., the healthcare industry) to accurately integrate data between different databases, since any inaccurate information that results from the integration can be serious. For example, in a scenario in which two databases storing data relating to patient information are integrated, any inaccuracies in data resulting from such integration could be life threatening.

Consider an example scenario in which two databases store data in a slightly different format for separate hospitals, where it is desirable to integrate these two databases while allowing these databases to separately maintain their information. It would be desirable, for consistent Electronic Medical Record (EMR) applications, to integrate the databases since patient records may be associated with more than one healthcare provider.

Database systems are provided for allowing a query and edit (e.g., insertion, deletion, update, etc.) of data from two or more integrated databases utilizing a single interface, typically referred to as an "integration hub". Typically, validation and verification of integrated databases is performed manually, where human interaction (e.g., a database administrator) is required to manually validate and correct errors in the integrated data. This can become an overwhelming and lengthy process that can further be prone to human error.

BRIEF SUMMARY

Embodiments of the present invention include a method, a system and a computer program product for resolving conflicts between data for database integration. Data is integrated from first and second data sources to produce integrated data, and the presence of a conflict is determined between data from the first data source and data from the second data source, where one or more sets of prioritized policies for resolving conflicts is associated with data of the first and second data sources. A policy is selected from the set of prioritized policies associated with the conflicted data, where the selected policy is appropriate to resolve the conflict and includes the greatest priority. The selected policy is applied to resolve the conflict and to produce a resulting data value for the integrated data.

DETAILED DESCRIPTION

Present invention embodiments pertain to systems and corresponding techniques and computer program products that automatically establish provenance for integrated databases that is utilized to resolve conflicts in data for the integrated databases, thus avoiding manual validation of the integrated data. One or more sets of prioritized policies are utilized to automatically resolve any conflicts between data that is integrated from two or more databases. Information from transaction logs associated with the data can be used to determine which policy should be used to resolve conflicts with the integrated data.

Figure 1:
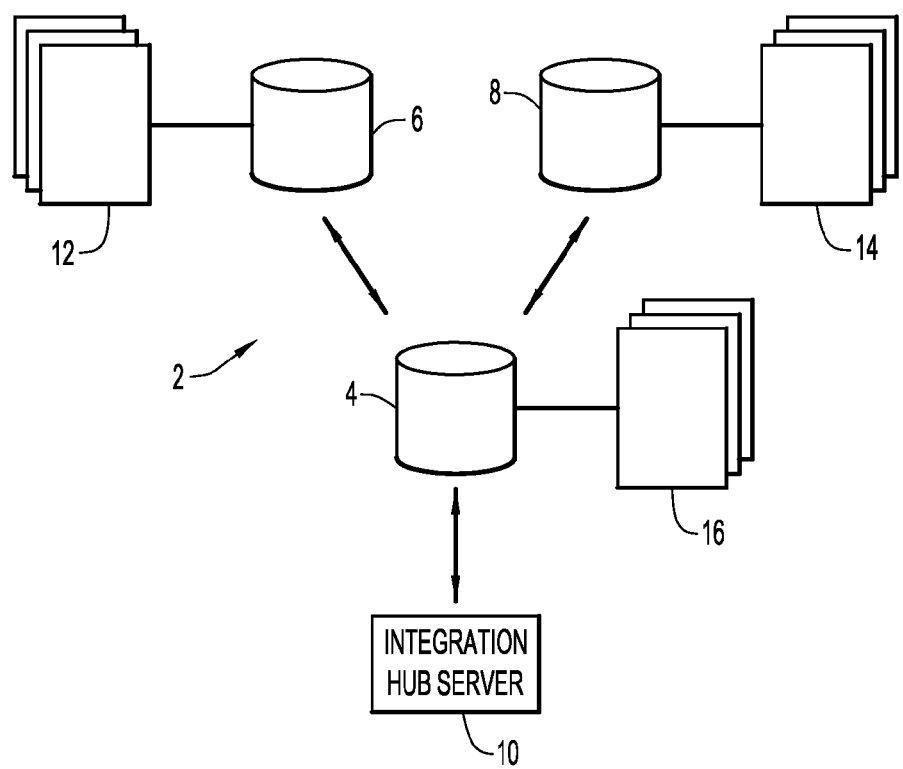
FIG. 1 is a diagrammatic illustration of a system providing a computing environment for an example embodiment of the present invention.

An example computing system in which data is integrated from different data sources is depicted in FIG. 1. System 2 includes an integrated database 4 that combines or integrates data from different databases, such as the two databases 6 and 8 depicted in FIG. 1. An integration hub server 10 is connected to the integration database 4 and is configured to analyze integrated data to resolve conflicts according to techniques as described herein. The databases and server can connect with each other via any suitable communication media that facilitates transfer/exchange of data between the server and databases including, without limitation, wide area networks (WAN), local area networks (LAN), Internet, Intranet, hardwire, wireless connections, etc.

Figure 2:
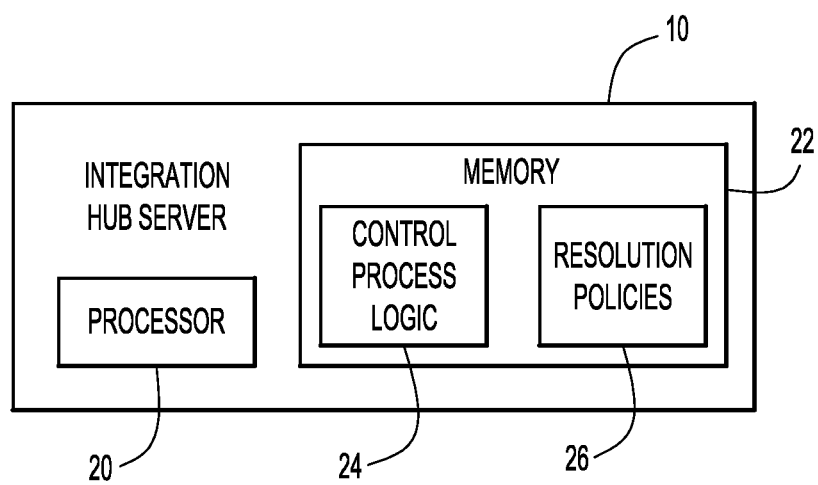
FIG. 2 is a diagrammatic illustration of an example of an integration hub server that can be utilized in the system of FIG. 1.

Referring to FIG. 2, the integration hub server 10 of the system may be implemented by any conventional or other computer system that is equipped with a processor 20 and a memory 22. The server 10 can further be equipped with an internal or external network interface and/or other communications devices (e.g., modem, network cards, etc.) and optional display or monitor devices as well as any other output devices (e.g., speakers) as well as input devices (e.g., a keyboard, mouse, or other input devices) to facilitate interaction with a user (e.g., an integration database administrator). The memory 22 can be RAM and/or ROM memory configured as one or more hardware units. The memory 22 includes control process logic software 24 including operating system code for the processor as well as any other commercially available and custom software to facilitate operations of the server 10 utilizing the processor 20 (e.g., browser software, communications software, server software, etc.). In addition, the memory 22 includes a resolution policies software module 26 including one or more applications that store resolution policies for resolving conflicts in data for the integrated database 4 in accordance with the techniques described herein.

The databases 4, 6, 8 can each comprise any suitable data memory storage devices with RAM and/or ROM memory and suitable storage capacity for storing data. In an example embodiment, the databases comprise relational databases that store data as records in the form of data tables, where the relational databases can further include other types of data. In particular, each database 4, 6, 8 depicted in FIG. 1 includes data comprising data records and database tables (shown generally as data elements 12, 14 and 16 in FIG. 1). For each of the databases 6 and 8, the data 14, 16 also includes transaction logs. The transaction logs comprise information associated with any changes to values in the records for the corresponding database. For example, the databases are configured such that any change to a record, such as an insertion, deletion or update to any field in the record associated with an entity, results in the generation of a corresponding transaction log file. The transaction log file can include any suitable information identifying the change made to the record including, without limitation, time stamp (e.g., date and time of the change), an identification of the user making the change, and the specific type of change made.

In accordance with the techniques described herein, the transaction logs associated with data from the databases being integrated are utilized by the integration hub server 10 to determine (based upon established conflict resolution policies stored within module 26) provenance for conflicting data within the integrated database 4 in order to resolve the conflicts. In particular, the transaction logs from, e.g., databases 6 and 8 can be searched by the server 10 in order to obtain provenance information for conflicting data. It is noted that different databases may have different log formats for transaction logs that are generated and stored on the databases. In addition, data transaction logs can be sequential and slow to search and can also roll over (i.e., be overwritten) at times. To account for this, a data repository can be developed (e.g., by providing a new database or within any of the existing databases, such as the integration database 4) utilizing a suitable software tool (e.g., IBM® InfoSphere Change Data Capture, IBM is a trademark of International Business Machines Corporation, registered in many jurisdictions worldwide) that records each Data Manipulation Language (DML) operation (e.g., insert, delete, update) for data within a database as an insert within a target table. The target table is identical to its corresponding source table but includes "provenance" columns which capture the data transaction logs (e.g., time/date stamp for when change occurred, user making change, specific type of change, etc.) that occur with manipulation of data within a database. Indices based on key columns and timestamps can be created on these database tables to allow for efficient queries to obtain the desired transaction log information associated with an entity.

Operation of the system of FIGS. 1 and 2 to determine and resolve conflicts of integrated data within an integrated database is now described with reference to the flow charts of FIGS. 3 and 4. Data is integrated from databases 6 and 8 into the integrated database 4 utilizing any known ETL (extract, transform, load) techniques and/or any other suitable data integration techniques. In particular, the data from database tables 12 and 14 of the databases 6 and 8 is integrated within integrated database tables 16 of the integrated database 4, with corresponding reference keys (primary and foreign) being assigned to the integrated database tables 16 so as to define relationships between entities in the integrated database tables 16 and also with the database tables 12, 14 of the databases 6, 8 being integrated.

Figure 3:
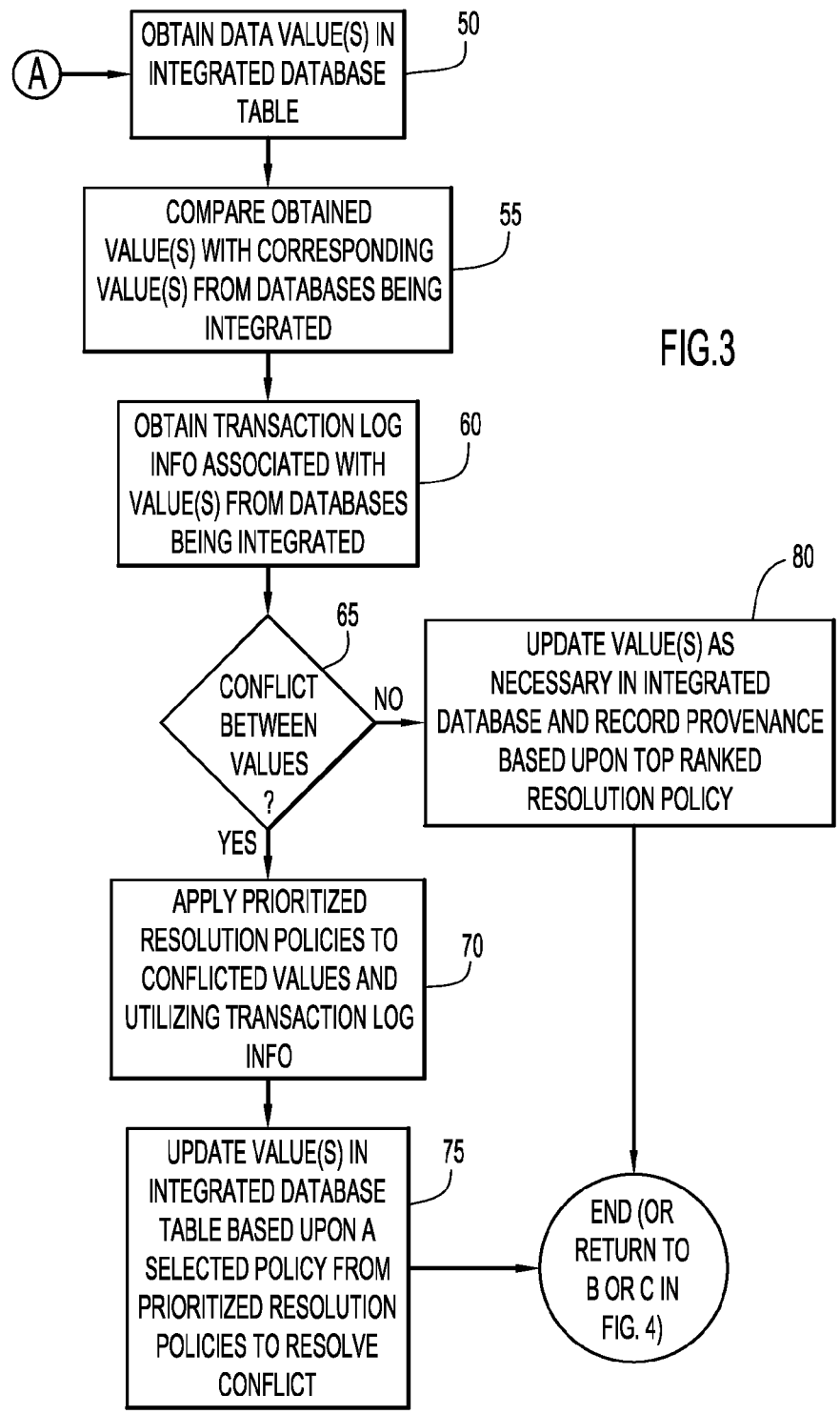
FIGS. 3 and 4 are procedural flow charts illustrating techniques in which potential conflicts between data values in an integrated database and corresponding data values in databases being integrated are resolved according to example embodiments of the present invention.

An example technique for resolving conflicts with data located within a row of an integrated database table 16 based upon one or more predefined resolution policies is depicted in the flow chart of FIG. 3. The process steps set forth in FIG. 3 are performed automatically utilizing the processor 20 of the integration hub server 10. It is noted that it is preferable for the databases that are being integrated to have compatible schemas for relating data and that a suitable mapping exists between database tables of the source databases and the target or integrated database. Further, conflicts are checked at the row level for integrated database tables for differences occurring at the column or child database table level. In addition, the transaction log information is archived and complete (i.e., not rolled over but instead stored and linked with corresponding data values utilizing any suitable software tool, such as IBM® InfoSphere Change Data Capture).

One or more data values within a row of the integrated database table 16, having been previously selected for analysis, are obtained (step 50) and are compared (step 55) with corresponding values within the databases being integrated (i.e., the values from the databases that were used to populate the integrated database table at the selected row). Transaction log information that is associated with the data values being compared within the databases being integrated is obtained (step 60). A determination is made regarding whether a conflict exists between the corresponding values within the databases being integrated (step 65). In response to a determination that there is no conflict, data value(s) within the selected row of the integrated database table 16 are updated as necessary with the conforming data values from the database tables 12, 14 of the databases 6, 8 and provenance information, including transaction log information associated with the data values of the databases 6, 8 and based upon the top ranked resolution policy that is applied to the data value(s) of the selected row, is recorded in association with the data value(s) of the selected row (step 80).

In response to a determination that there is a conflict, transaction log information that is associated with the data values being compared within the databases being integrated is obtained (step 65). A set of resolution policies that correspond with the integrated database table 16 are obtained from the resolution policies module 26, and one or more resolution policies are applied based upon the obtained transaction log information (step 70). The specific set of resolution policies and the prioritization of such policies to be applied for a particular row of an integration database table 16 can be selected based upon any suitable criteria. For example, the criteria may be applied for all rows of each integrated database table to be analyzed for potential conflicts. Alternatively, a set of prioritized resolution policies can be specific to a specific integrated database table and/or data values being analyzed for a specific row and/or specific column of a specific integrated database table.

The best one or more policies from the list of resolution policies are automatically applied to resolve the conflict between data values. Consider, for example, a scenario in which the data values are associated with persons (e.g., patients in a hospital). The integrated database table 16 for the integrated database 4 contains the following data values for a person (e.g., data values within a column from a row of the integrated database table associated with the selected person): "date of birth=Oct. 25, 1977", and "age=34". A corresponding database table 12 for database 6 includes the information for the same person (where the same person is identified by a primary key ID, e.g., the primary key ID=1234) as "date of birth=Oct. 25, 1977", where the transaction log information for this data value indicates that the date of birth was entered based upon the person's drivers license information and the data was entered on Mar. 22, 2011. A corresponding database table 14 for database 8 includes information for the same person (e.g., same primary key ID=1234) as "age=34", where the transaction log information for this data value indicates that the date of birth is computed based upon year only. The conflict resolution policy for the data values being considered in this scenario may be prioritized based upon accurate age information, where all components of a date of birth are considered to compute the person's age. Another prioritized resolution policy may be to utilize data values which are more recent (i.e., more recent updated values have priority). If the date of birth resolution policy (where all components of age are used to compute person's age) is prioritized over the age/most recent update policy, the "age=33" data value for this person is determined as most accurate and is utilized to resolve the conflict. The integrated database table 16 would therefore be updated by changing the person's age to the "age=33" data value.

In another embodiment, consider an example (i.e., non-limiting) list of potential resolution policies that may be applied for resolving conflicts, where a prioritized order of such policies (i.e., #1 having the greatest priority, followed by #2, etc.) is as follows:
1. Derivation (where entered data is prioritized over calculated data)
2. A user ID or other selected ID (e.g., data values associated with a particular user ID are prioritized over all other data values)
3. Age/history of a data value (e.g., the earliest or latest change, such as an update, insertion or deletion, to a data value has priority over all other data values)
4. Database provided based (i.e., the data values from one or more selected databases are always prioritized over data values from other selected databases)
5. Manual resolution (no automatic resolution can be identified from selected resolution polices, so the data value conflict must be resolved manually, an indication can be provided by the integration hub server that manual resolution of the conflicted data must be implemented)

An example in which manual resolution might occur can be a scenario such as when the data values corresponding with the same entity from two databases are marked as "entered data" (e.g., the transaction log information for the data values marks these values as "entered data"). In this scenario, the first policy (Policy #1) cannot be utilized to resolve the conflict between the data values. If no other policy can be implemented, manual resolution would be selected as the policy to apply to the data values (where manual intervention is required to determine which entered data value is the most accurate).

In a scenario in which there are two or more potential policies that are applicable to the data values being compared, the highest priority resolution policy is chosen for application to the data values. Consider the following example, in which databases 6 and 8 are associated with hospitals and include data records with data values associated with patients and prescriptions associated with such patients. Database 6 may include a database table 12 that includes the following information about a patient (including the following transaction log information):
Patient name: Tom Swift
SSN: 111-22-3333
Date of Birth: Oct. 20, 1977
Age: 32
Transaction log information: tswift, update, "Oct. 20, 1977", 07/15/10

The transaction log information indicates that an update was made for this record on Jul. 15, 2010 by user ID tswift, where the update was the patient's date of birth (Oct. 20, 1977).

In this scenario, database 8 includes a database table 14 that includes the following information about a patient (including the following transaction log information):
Patient name: Tom Swift
SSN: 111-22-3333
Date of Birth: Oct. 20, 1978
Age: 30
Transaction log information: jdoe, update, "Oct. 20, 1978", Mar. 7, 2009

The transaction log information for the record associated with this database table 14 indicates that an update was made for this record on Mar. 7, 2009 by user ID jdoe, where the update was the patient's date of birth (Oct. 20, 1978).

In this scenario, there is a conflict in the date of birth and age data values for the patient between databases 6 and 8 which must be resolved. Two potential policies that might be applicable for resolving the conflict are the age based policy (policy #3 in the previous prioritized policy list, where earliest update takes priority over later updates) and user ID policy (policy #2 on the previous prioritized policy list, where the user ID tswift is assigned the greatest priority of all user IDs, since this user ID is associated with the patient). Since the user ID policy has priority over the age based policy, the conflict is resolved by application of this policy. The integrated database table 16 is updated such that the data value for date of birth is "Oct. 20, 1977" and the data value for age is "32".

Upon determination of the best resolution policy for the data values in conflict (based upon the types and prioritization of potential resolution policies associated with such data values), the selected resolution policy is applied to resolve the conflict, and the integrated database table is updated at the selected row with the appropriate data value or values.

Figure 4:
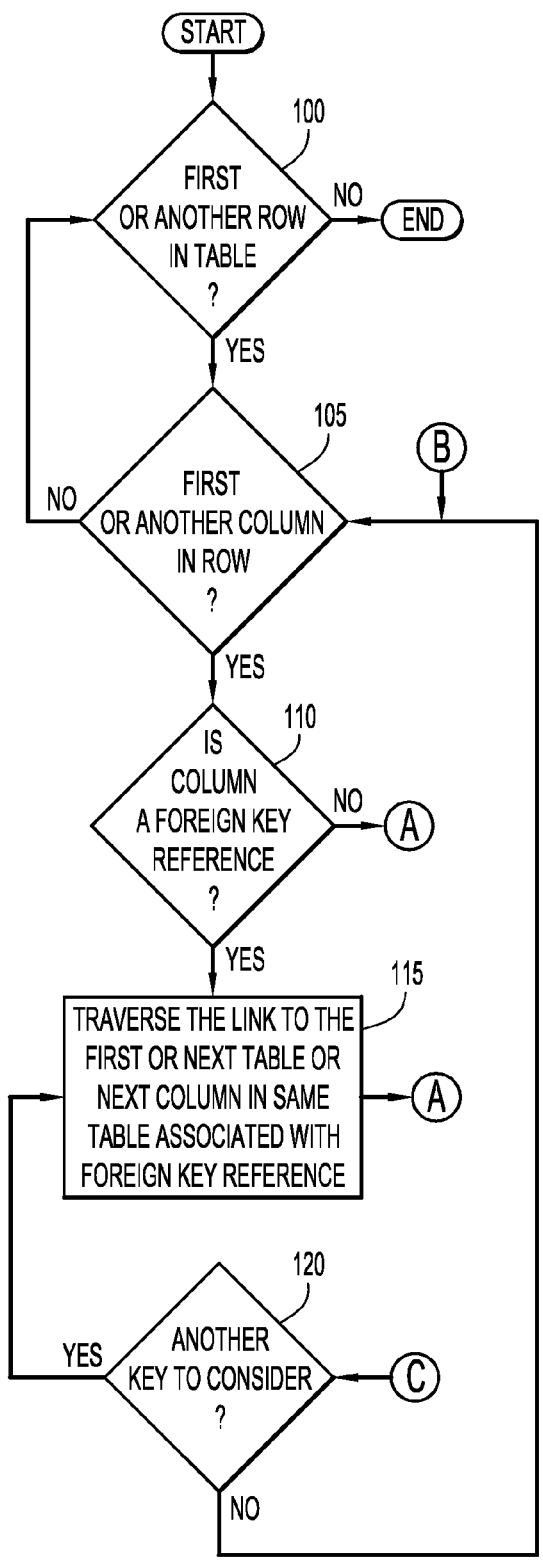

The identification and resolution of potential conflicts can be achieved for the data integrated within the integrated database by analyzing each row for each integrated database table in the manner as set forth in the flow chart of FIG. 4.

The techniques set forth in FIG. 4 relate to analyzing each integrated table 16 within the integrated database 4. For every row in the integrated table 16 being analyzed and for every column (steps 100 and 105), a determination is made whether the column represents a foreign key reference to one or more other databases (step 110). In response to a determination that the column does not represent any foreign key reference, the techniques described in the flow chart of FIG. 3 are applied to the data value of the selected row and column starting at step 50. It is noted that the prioritized resolution policies for that particular selected row and column (as obtained from the resolution policies module 26) are applied for the data value of that row and column in response to a conflict being identified or determined, and the data value of that row and column are updated accordingly based upon the process steps of FIG. 3. Upon completion of the process steps of FIG. 3, the process returns to step 105 in the process of FIG. 4 (via reference B).

In response to the determination that the column represents a foreign key reference, for each relationship to another database table represented by a set of columns representing a primary key (e.g., in an N–1 relationship or an M-N relationship), each link is traversed to the next link (steps 115 and 120), where the next link may be the next database table (e.g., in a 1-1 or N–1 relationship) or another column of the same database table (e.g., in an M-N relationship) to which a relationship exists with the current row and column of the integrated database table. Upon traversing to the next link, the process set forth in FIG. 3 and beginning with step 50 is recursively applied for each link between the data value of the selected row and column and the data value associated with the primary key of the database table being considered. After the steps of the process of FIG. 3 have been applied, the process loops back (via reference C) to step 120. The process of FIG. 4 continues for each integrated database table 16 of the integrated database 4, such that each selected row and each column of the selected row are analyzed for conflicting data values and a selected resolution policy is applied for an identified or determined conflict based upon the process of FIG. 3, until all rows of the integrated database table have been analyzed.

Thus, the systems, computer program products and corresponding methods described herein provide an automated mechanism for identifying or determining the presence of a conflict in data values integrated within an integrated database from two or more databases and applying a selected resolution policy to resolve the conflict and update the data values within the integrated database (if necessary). The resolution policies are determined based upon provenance associated with the data values of the databases, where the provenance is determined based upon information comprising transaction log information associated with data values in the databases being integrated.

The techniques described herein are useful for any number of databases being integrated. While the techniques described herein compare data values in a pair between two databases of a set of databases in order to determine and resolve conflicts in data, it is noted that the priority based determination of which resolution policy to select from a set of resolution polices is associative. Thus, if there are more than two databases in which data is integrated (e.g., databases A, B and C), two databases (e.g., databases A and B) can be compared first, and the merged or integrated result can then be compared with the next database (i.e., integrated databases A, B compared with database C) and so on until all databases have been analyzed for conflicts.

It will be appreciated that the embodiments described above and illustrated in the drawings represent only a few of the many ways of implementing embodiments for resolving conflicts between data for data integration.

The topology or environment of the present invention embodiments may include any number of computer or other processing systems (e.g., client or end-user systems, server systems, etc.) and search engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any available operating system and any available or custom software (e.g., browser software, communications software, server software, natural language processing software, search engine and web crawling software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among any one or more types of computing systems, including end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number data sources implemented as any conventional or other types of databases, data stores or storage structures (e.g., files, databases, data structures, data or other repositories, etc.) to store documents and related content associated with such documents.

The present invention embodiments may employ any number of any type of user interface (e.g., Graphical User Interface (GUI), command-line, prompt, etc.) for obtaining or providing information (e.g., obtaining information for a desired query of one or more data sources, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A computer-implemented method of resolving conflicts between data for database integration comprising:
   integrating data from first and second data sources to produce integrated data comprising one or more integrated database tables;

determining, for each column of each row for the one or more integrated database tables, whether a foreign key reference is present;

in response to determining that a foreign key reference is present, traversing a link corresponding to the foreign key reference to access data associated with the foreign key reference in one or more other database tables;

determining a presence of conflicted data between data from the first data source and data from the second data source, wherein at least one of the first data source and the second data source includes data associated with the foreign key reference, one or more sets of prioritized policies for resolving conflicts is associated with data of the first and second data sources, and at least one policy comprises a manual resolution policy that provides an indication to implement manual resolution of the conflicted data by a user;

selecting a policy for the column from the one or more sets of prioritized policies associated with the conflicted data based on database transaction log information indicating data provenance of the first and second data sources, wherein the selected policy is appropriate to resolve the conflicted data and is automatically selected from among the one or more sets of prioritized policies when the policy has a priority over all other prioritized policies, and in the event there is not a single policy from the one or more sets of prioritized policies that has priority over all other prioritized policies, selecting the policy that is the manual resolution policy; and applying the selected policy to the column to resolve the conflicted data and produce a resulting data value for the integrated data.

2. The method of claim 1, wherein the transaction log information comprises at least one of a description of a change made to data in which the change comprises at least one of an update to data, an insertion of data and a deletion of data, an identification of a user making a change to data, and a time stamp identifying when a change to data was made.

3. The method of claim 1, wherein the one or more sets of prioritized policies comprises at least one of a policy that prioritizes based upon distinguishing between entered data and calculated data associated with the conflicted data, a policy that prioritizes based upon an identification of one or more users associated with the conflicted data, a policy that prioritizes based upon a determined age of an update, insertion or deletion of data associated with the conflicted data, and a policy that prioritizes based upon a data source associated with the conflicted data.

4. The method of claim 1, further comprising:
selecting the one or more sets of prioritized policies based upon at least one of a specific integrated database table and a specific row or a specific column of an integrated database table being analyzed for determining the presence of a conflict.

5. A computer readable program product for resolving conflicts between data for database integration, the computer program product comprising:
at least one computer readable storage device having computer readable program code embodied therewith, the computer readable program code configured to:
integrate data from first and second data sources to produce integrated data comprising one or more integrated database tables;
determine, for each column of each row for the one or more integrated database tables, whether a foreign key reference is present;

traverse, in response to determining that a foreign key reference is present, a link corresponding to the foreign key reference to access data associated with the foreign key reference in one or more other database tables;

determine a presence of conflicted data between data from the first data source and data from the second data source, wherein at least one of the first data source and the second data source includes data associated with the foreign key reference, one or more sets of prioritized policies for resolving conflicts is associated with data of the first and second data sources, and at least one policy comprises a manual resolution policy that provides an indication to implement manual resolution of the conflicted data by a user;

select a policy for the column from the one or more sets of prioritized policies associated with the conflicted data based on database transaction log information indicating data provenance of the first and second data sources, wherein the selected policy is appropriate to resolve the conflicted data and is automatically selected from among the one or more sets of prioritized policies when the policy has a priority over all other prioritized policies, and in the event there is not a single policy from the one or more sets of prioritized policies that has priority over all other prioritized policies, selecting the policy that is the manual resolution policy; and apply the selected policy to the column to resolve the conflicted data and produce a resulting data value for the integrated data.

6. The computer readable program product of claim 5, wherein the transaction log information comprises at least one of a description of a change made to data in which the change comprises at least one of an update to data, an insertion of data and a deletion of data, an identification of a user making a change to data, and a time stamp identifying when a change to data was made.

7. The computer readable program product of claim 5, wherein the one or more sets of prioritized policies utilized by the computer readable program code to resolve conflicts comprises at least one of a policy that prioritizes based upon distinguishing between entered data and calculated data associated with the conflicted data, a policy that prioritizes based upon an identification of one or more users associated with the conflicted data, a policy that prioritizes based upon a determined age of an update, insertion or deletion of data associated with the conflicted data, and a policy that prioritizes based upon a data source associated with the conflicted data.

8. The computer readable program product of claim 5, wherein the computer readable program code is further configured to:
select the one or more sets of prioritized policies based upon at least one of a specific integrated database table and a specific row or a specific column of an integrated database table being analyzed for determining the presence of a conflict.

9. A system for resolving conflicts between data for database integration, the system comprising:
a processor configured with logic to:
integrate data from first and second data sources to produce integrated data comprising one or more integrated database tables;
determine, for each column of each row for the one or more integrated database tables, whether a foreign key reference is present;

traverse, in response to determining that a foreign key reference is present, a link corresponding to the foreign key reference to access data associated with the foreign key reference in one or more other tables;

determine a presence of conflicted data between data from the first data source and data from the second data source, wherein at least one of the first data source and the second data source includes data associated with the foreign key reference, one or more sets of prioritized policies for resolving conflicts is associated with data of the first and second data sources, and at least one policy comprises a manual resolution policy that provides an indication to implement manual resolution of the conflicted data by a user;

select a policy for the column from the one or more sets of prioritized policies associated with the conflicted data based on database transaction log information indicating data provenance of the first and second data sources, wherein the selected policy is appropriate to resolve the conflicted data and is automatically selected from among the one or more sets of prioritized policies when the policy has a priority over all other prioritized policies, and in the event there is not a single policy from the one or more sets of prioritized policies that has priority over all other prioritized policies, selecting the policy that is the manual resolution policy; and apply the selected policy to the column to resolve the conflicted data and produce a resulting data value for the integrated data.

10. The system of claim 9, wherein the transaction log information comprises at least one of a description of a change made to data in which the change comprises at least one of an update to data, an insertion of data and a deletion of data, an identification of a user making a change to data, and a time stamp identifying when a change to data was made.

11. The system of claim 9, wherein the one or more sets of prioritized policies utilized by the processor to resolve conflicts comprises at least one of a policy that prioritizes based upon distinguishing between entered data and calculated data associated with the conflicted data, a policy that prioritizes based upon an identification of one or more users associated with the conflicted data, a policy that prioritizes based upon a determined age of an update, insertion or deletion of data associated with the conflicted data, and a policy that prioritizes based upon a data source associated with the conflicted data.

12. The system of claim 9, wherein the processor is further configured to:

select the one or more sets of prioritized policies based upon at least one of a specific integrated database table and a specific row or a specific column of an integrated database table being analyzed for determining the presence of a conflict.

13. The method of claim 1, further comprising:

determining, in response to the presence of conflict conflicted data between the first and second data sources, which of the first data source and the second data source has provenance for the conflicted data; and prioritizing policies of the one or more sets of prioritized policies based upon the determination of provenance.

14. The computer readable program product of claim 5, wherein the computer readable program code is further configured to:

determine, in response to the presence of conflicted data between the first and second data sources, which of the first data source and the second data source has provenance for the conflicted data; and prioritize policies of the one or more sets of prioritized policies based upon the determination of provenance.

15. The system of claim 9, wherein the computer readable program code is further configured to:

determine, in response to the presence of conflicted data between the first and second data sources, which of the first data source and the second data source has provenance for the conflicted data; and prioritize policies of the one or more sets of prioritized policies based upon the determination of provenance.

* * * * *